US009563821B2

(12) United States Patent
Cheon et al.

(10) Patent No.: US 9,563,821 B2
(45) Date of Patent: *Feb. 7, 2017

(54) METHOD, APPARATUS AND COMPUTER READABLE RECORDING MEDIUM FOR DETECTING A LOCATION OF A FACE FEATURE POINT USING AN ADABOOST LEARNING ALGORITHM

(71) Applicant: Intel Corporation, Santa Clara, CA (US)

(72) Inventors: Yeongjae Cheon, Seoul (KR); Yongchan Park, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,284

(22) Filed: Oct. 29, 2015

(65) Prior Publication Data

US 2016/0078319 A1 Mar. 17, 2016

Related U.S. Application Data

(63) Continuation of application No. 14/129,356, filed as application No. PCT/KR2012/007843 on Sep. 27, 2012, now Pat. No. 9,202,109.

(30) Foreign Application Priority Data

Sep. 27, 2011 (KR) .......................... 10-2011-0097794

(51) Int. Cl.
*G06K 9/62* (2006.01)
*G06K 9/68* (2006.01)
(Continued)

(52) U.S. Cl.
CPC ......... *G06K 9/6257* (2013.01); *G06K 9/00221* (2013.01); *G06K 9/00228* (2013.01);
(Continued)

(58) Field of Classification Search
None
See application file for complete search history.

(56) References Cited

U.S. PATENT DOCUMENTS 8,243,790 B2 * 8/2012 Leontaris ............. H04N 19/105
375/240.02
2004/0186816 A1 9/2004 Lienhart et al.
(Continued)

FOREIGN PATENT DOCUMENTS

JP 2009/015614 1/2009
KR 100682906 2/2007
(Continued)

OTHER PUBLICATIONS

PCT Search Report, PCT/KR2012/007843, Feb. 7, 2013, 2 pages.
(Continued)

*Primary Examiner* — Randolph I Chu
(74) *Attorney, Agent, or Firm* — Blakely, Sokoloff, Taylor & Zafman LLP

(57) ABSTRACT

The present disclosure relates to detecting the location of a face feature point using an Adaboost learning algorithm. According to some embodiments, a method for detecting a location of a face feature point comprises: (a) a step of classifying a sub-window image into a first recommended feature point candidate image and a first non-recommended feature point candidate image using first feature patterns selected by an Adaboost learning algorithm, and generating first feature point candidate location information on the first recommended feature point candidate image; and (b) a step of re-classifying said sub-window image classified into said
(Continued)

first non-recommended feature point candidate image, into a second recommended feature point candidate image and a second non-recommended feature point candidate image using second feature patterns selected by the Adaboost learning algorithm, and generating second feature point candidate location information on the second recommended feature point recommended candidate image.

16 Claims, 6 Drawing Sheets

(51) Int. Cl.
 *G06K 9/70* (2006.01)
 *G06K 9/00* (2006.01)
 *G06K 9/32* (2006.01)

(52) U.S. Cl.
 CPC ..... *G06K 9/00281* (2013.01); *G06K 9/00288* (2013.01); *G06K 9/3233* (2013.01); *G06K 9/6202* (2013.01); *G06K 9/6219* (2013.01); *G06K 9/6227* (2013.01); *G06K 9/6232* (2013.01); *G06K 9/6262* (2013.01); *G06K 9/6221* (2013.01)

(56) References Cited

U.S. PATENT DOCUMENTS

| | | | |
|---|---|---|---|
| 2006/0120604 A1 | 6/2006 | Kim et al. | |
| 2006/0140614 A1* | 6/2006 | Kim | G06K 9/00228 396/153 |
| 2008/0219517 A1 | 9/2008 | Blonk et al. | |

FOREIGN PATENT DOCUMENTS

| | | |
|---|---|---|
| KR | 1020090129255 | 12/2009 |
| KR | 1020100089360 | 8/2010 |
| KR | 1020110002338 | 1/2011 |
| KR | 1020110012820 | 2/2011 |
| WO | WO-2011-092865 | 8/2011 |

OTHER PUBLICATIONS

Li S Z et al: "FloatBoost Learning and Statistical Face Detection", IEEE Transactions on Pattern Analysis and Machine Intelligence, IEEE Computer Society, USA, vol. 26, No. 9, Sep. 2004 (Sep. 2004), pp. 1112-1123.

Rowley H A et a: "Neural Network-Based Face Detection", IEEE Transactions on Pattern Analysis and Machine Intelligence, IEEE Computer Society, USA, vol. 20, No. 1, Jan. 1998 (Jan. 1998), pp. 23-38.

Flitti F et al: "Face Detection Using Classifiers Cascade Based on Vector Angle Measure and Multi-Modal Representation", Signal Processing Systems, 2007 IEEE Workhop on, IEEE, PI, Oct. 2007 (Oct. 2007), pp. 539-542.

Ajmal Mian: "Robust realtime feature detection in raw 3D face images", Applications of Computer Vision (WACV), 2011 IEEE Workshop on, IEEE, Jan. 5, 2011, pp. 220-226.

Shervin Mehryar et al: "Automatic Landmark detection for 3D face image processing", Evolutionary Computation (CEC), 2010 IEEE Congress on, IEEE, Piscataway, NJ, USA, Jul. 18, 2010, pp. 1-7.

Froba B et al: "Face detection with the modified census transform", Automatic Face and Gesture Recognition, 2004. Proceedings. Sixth IEEE, International Conference on, IEEE, Piscataway, NJ, USA, May 17, 2004, pp. 91-96.

Viola P et al: "Robust Real-Time Face Detection", International Journal of Computer Vision, Dordrecht, NL, vol. 57, No. 2, 2004, pp. 137-154.

European Search Report for EP Counterpart Application No. 12836458.5, 12 pgs., (Mar. 16, 2016).

Gaya Kola et al., "Boosted cascade learning algorithm for recognizing different type objects having similar features," the institute of Electronics, Information and Communication Engineers technical study report, Japan, a corporation of the institute of Electronics, Information and Communication, Mar. 5, 2008, vol. 107, No. 542, p. 489-494.

* cited by examiner

METHOD, APPARATUS AND COMPUTER READABLE RECORDING MEDIUM FOR DETECTING A LOCATION OF A FACE FEATURE POINT USING AN ADABOOST LEARNING ALGORITHM

The present patent application is a continuation application of U.S. application Ser. No. 14/129,356, filed Jan. 28, 2014, pending, which is a U.S. National Phase Application under 35 U.S.C. 371 of International Application No. PCT/KR2012/007843 filed Sep. 27, 2012, which claims priority from Korean Application No. 10-2011-0097794, filed Sep. 27, 2011, the contents of which are incorporated herein in their entirety by reference.

TECHNICAL FIELD

The present disclosure relates to a method, apparatus, and computer-readable recording medium for detecting the position of a face feature point by using an Adaboost learning algorithm. More specifically, the present disclosure relates to a method, apparatus, and computer-readable recording medium for more correctly detecting the position of a face feature point in a facial image of an unusual state by using a multi-layer Adaboost classifier.

BACKGROUND

Biometrics is the technology for recognizing physical features, such as a fingerprint, a face, an iris, a vein, and the like, which are different from person to person. Such physical features cannot be stolen or copied by others like a key or password and may be utilized in the security field or the like since they are not at the risk of being changed or lost. Face recognition is a type of biometric technology that includes a technique of detecting a face region in a video or a picture image and identifying the identity of a face included in the detected face region. Such face recognition technology can be utilized in not only the security field, but also a variety of applications in line with the progress during the smart phone age.

Specifically, face recognition is a technique for identifying a face in a detected facial image by using positions of feature points. The feature points may include a center point of an eye, both end points of each eye, both end points and a center point of an eyebrow, both end points of a lip or the like.

Techniques such as a histogram, principal component analysis (PCA), and Adaboost learning algorithm are used for detecting positions of such face feature points, and these methods generally provide good results to some extent when they are applied to ordinary facial images (i.e., normal facial images).

However, there is a problem in that considerable degradation in performance is observed in detecting positions of feature points when these methods are applied to unusual facial images (e.g., a facial image of a person wearing glasses, a facial image with a portion of a face hidden behind hairs, a facial image of a person with exaggerated facial expressions, a non-frontal facial image, a partially dark facial image, an image with closed eyes, or the like).

Accordingly, it is necessary to develop a technique that guarantees consistent performance in detecting positions of feature points of unusual facial images as well as ordinary facial images.

DETAILED DESCRIPTION

Technical Problem

Therefore, an object of the present disclosure is to solve the above-described problems.

In addition, another object of the present disclosure is to guarantee performance in detecting positions of face feature points by accurately detecting positions of candidate feature points in unusual facial images as well as positions of candidate feature points in ordinary facial images, while using an Adaboost learning algorithm to detect positions of face feature points.

Technical Solution

The representative configurations of the present disclosure for achieving the above objects are as follows.

According to an aspect of the present disclosure, there is provided a method of detecting a position of a face feature point by using an Adaboost learning algorithm. The method includes (a) classifying a sub-window image into a first feature point candidate recommendation image and a first feature point candidate non-recommendation image using first feature patterns selected through the Adaboost learning algorithm, and generating first feature point candidate position information of the first feature point candidate recommendation image; and (b) re-classifying the sub-window image classified as the first feature point candidate non-recommendation image into a second feature point candidate recommendation image and a second feature point candidate non-recommendation image using second feature patterns selected through the Adaboost learning algorithm, and generating second feature point candidate position information of the second feature point candidate recommendation image.

According to another aspect of the present disclosure, there is provided an apparatus for detecting a position of a face feature point using an Adaboost learning algorithm. The apparatus includes a classifier for classifying a sub-window image into a first feature point candidate recommendation image and a first feature point candidate non-recommendation image using first feature patterns selected through the Adaboost learning algorithm, and generating first feature point candidate position information of the first feature point candidate recommendation image; and at least one re-classifier for re-classifying the sub-window image classified as the first feature point candidate non-recommendation image into a second feature point candidate recommendation image and a second feature point candidate non-recommendation image using second feature patterns selected through the Adaboost learning algorithm, and generating second feature point candidate position information of the second feature point candidate recommendation image.

The aspects of the present disclosure are characterized in that the first feature patterns are based on features of an ordinary facial image, the second feature patterns are based on features of an unusual facial image, and each of the first feature patterns and the second feature patterns designates one or more dark regions and one or more bright regions.

According to still another aspect of the present disclosure, there is further provided a feature point candidate position generation unit for generating and storing the first feature point candidate position information and the second feature point candidate position information for sub-window images of a facial image; and a feature point candidate position clustering unit for forming clusters by performing clustering for the first feature point candidate position information and the pieces of the second feature point candidate position information, and generating position information of a center point position for the first feature point candidate position information and the second feature point candidate position information forming the largest cluster among the clusters as feature point position information.

In addition, there is further provided a computer-readable recording medium for recording a computer program for executing the above-described methods for implementing the present disclosure.

Advantageous Effects

According to the present disclosure, there is obtained an effect of improving performance in detecting positions of feature points by detecting positions of candidate feature points of an unusual facial image as well as positions of candidate feature points of an ordinary facial image.

EMBODIMENTS

Figure 1:
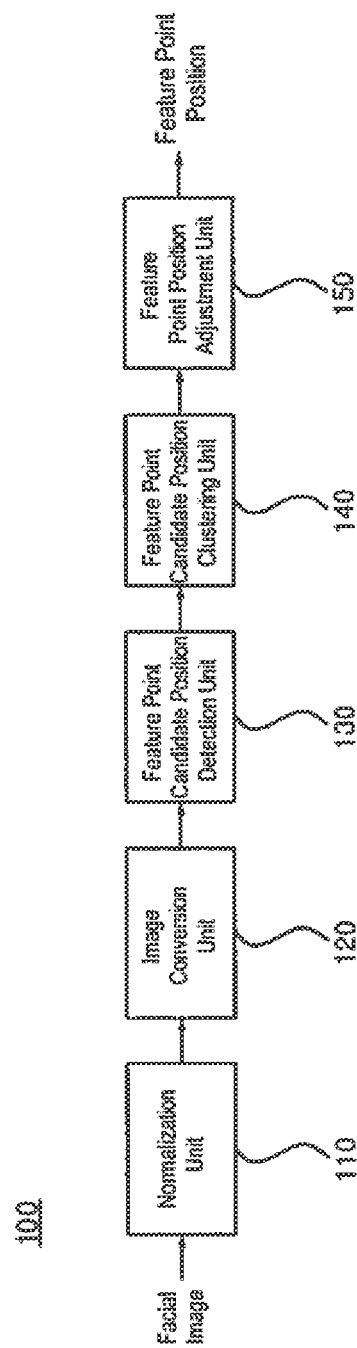
FIG. 1 is a block diagram showing a configuration of an apparatus for detecting a position of a face feature point in accordance with an embodiment of the present disclosure.

In the following detailed description of the present disclosure, references are made to the accompanying drawings that show, by way of illustration, specific embodiments in which the present disclosure may be implemented. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim. In the drawings, like reference numbers may refer to the same or similar function in many respects.

Hereinafter, various embodiments of the present disclosure will be described in detail with reference to the accompanying drawings in order that those skilled in the art may easily implement the present disclosure.

FIG. 1 is a block diagram 100 showing a configuration of an apparatus for detecting a position of a face feature point in accordance with an embodiment of the present disclosure.

Referring to FIG. 1, the block diagram 100 represents an apparatus for detecting a position of a face feature point may include a normalization unit 110, an image conversion unit 120, a feature point candidate position detection unit 130, a feature point candidate position clustering unit 140, and a feature point position adjustment unit 150.

Functions of each block shown in FIG. 1 are as follows.

The normalization unit 110 may normalize a facial image into a grey image of a predetermined size. The input facial image may be a color image and may be of a variety of sizes. The normalization unit 110 may normalize an input facial image into a grey image of a predetermined size in order to detect positions of feature points in facial images of various sizes.

The image conversion unit 120 may convert a grey image into a multi-scale image by performing modified census transform (MCT). That is, the image conversion unit 120 may convert the grey image into an image having a scale larger than the scale of the grey image. For example, if each pixel of the grey image has 256 scales from 0 to 255, the image conversion unit 120 may convert each pixel of the grey image to have 512 scales from 0 to 511.

The feature point candidate position detection unit 130, when a sub-window image of a multi-scale image is input, classifies the sub-window image as one of a first feature point candidate recommendation image and a first feature point candidate non-recommendation image by using first feature patterns, the first feature patterns having been selected by learning the patterns of an ordinary facial image using an Adaboost learning algorithm. When the sub-window image classified as the first feature point candidate non-recommendation image is input, the feature point candidate position detection unit 130 may classify the sub-window image classified as the first feature point candidate non-recommendation image into a second feature point candidate recommendation image and a second feature point candidate non-recommendation image by using second feature patterns, the second feature patterns having been selected by learning the patterns of an unusual facial image using the Adaboost learning algorithm. The feature point candidate position detection unit 130 may output first feature point position information of the first feature point candidate recommendation image and second feature point position information of the second feature point candidate recommendation image.

Here, with regard to the classifying of the sub-window image as one of the first feature point candidate recommendation images or the first feature point candidate non-recommendation image by using the first feature patterns (which were selected by learning the patterns of an ordinary facial image using the Adaboost learning algorithm), the first feature pattern may refer to a pattern included in at least one strong classifier in a first layer (which is described later). In this instance, if a plurality of strong classifiers is included in the first layer, it is apparently understood that the patterns included in the respective strong classifiers of the first layer may be different from one another. In addition, when a sub-window image classified as the first feature point candidate non-recommendation image is input into the feature point candidate position detection unit 130, in classifying the sub-window image classified as the first feature point candidate non-recommendation image into the second feature point candidate recommendation image and the second feature point candidate non-recommendation image by using the second feature patterns, the second feature patterns having been selected by learning the patterns of an unusual facial image using the Adaboost learning algorithm, the second feature patterns may refer to a pattern included in at least one strong classifier in a second or subsequent layer (i.e., the second to k-th layers), which is described later. In this instance, it is apparently understood that the patterns included in the respective strong classifiers may be different from one another between the layers or even within the same layer.

In addition, the various embodiments of the present disclosure is characterized in that the first feature patterns are based on the features of an ordinary facial image, the second feature patterns are based on the features of an unusual facial image, and each of the first feature patterns and the second feature patterns designates one or more dark regions and one or more bright regions. Here, whether or not a facial image is an ordinary facial image may be determined by comparing the facial image with a normal facial image and determining whether or not a difference therebetween exceeds a preset threshold value. Whether a region included in the first and second feature patterns is a dark region or a bright region may be determined based on at least one preset brightness value. More specifically, if a facial image is determined as an unusual facial image, the abnormality may be graded, and to this end, a plurality of preset threshold values may be prepared.

Figure 2:
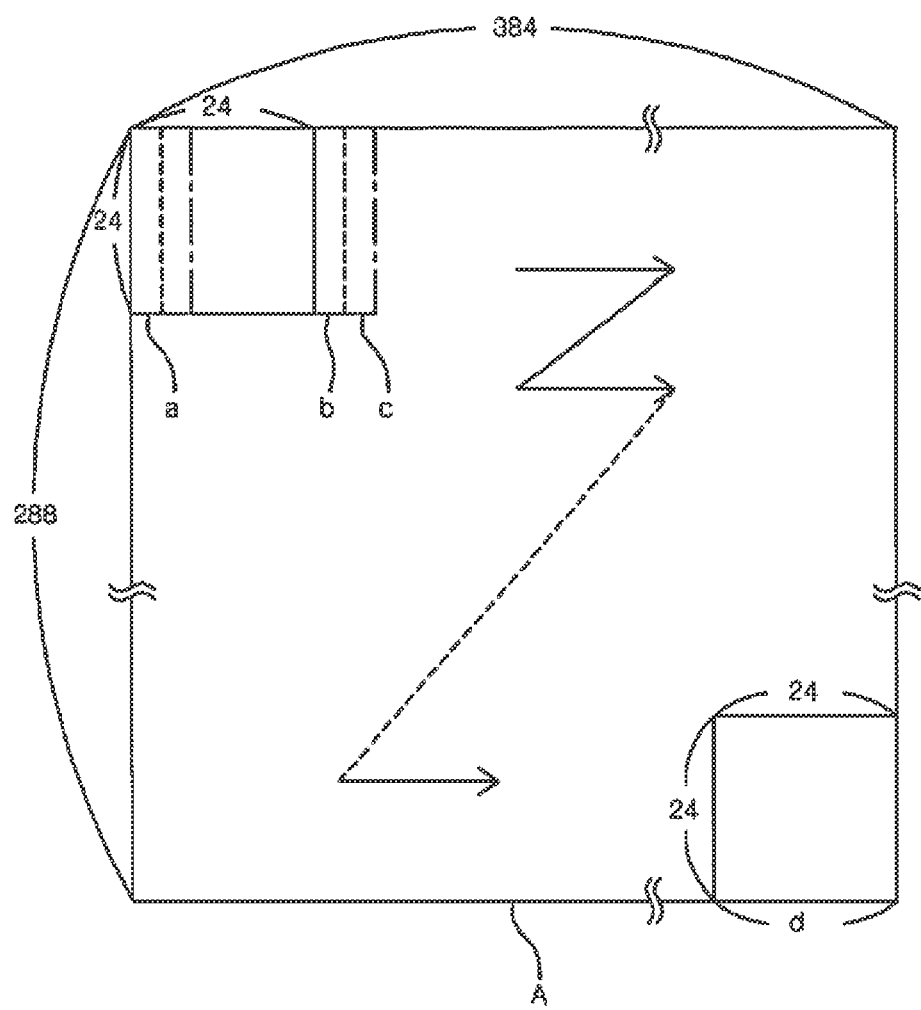
FIG. 2 illustrates a sub-window image to be input into a feature point candidate position detection unit in accordance with an embodiment of the present disclosure.

FIG. 2 is a diagram for illustrating a sub-window image to be input into the feature point candidate position detection unit 130 in accordance with an embodiment of the present disclosure. In FIG. 2, reference symbol A may denote an image having a size of 384×288 converted by the image conversion unit 120, and reference symbols a, b, c and d may denote sub-window images each having a size of 24×24 that are sequentially input into the feature point candidate position detection unit 130. That is, the images from the first sub-window image a to the last sub-window image d obtained while moving from the first pixel to the last pixel of the image A by a predetermined pixel unit may be sequentially input into the feature point candidate position detection unit 130.

The feature point candidate position clustering unit 140 may create clusters by performing clustering with reference to feature point position information of the first feature point candidate recommendation images and the second feature point candidate recommendation images obtained from image A and detected by the feature point candidate position detection unit 130 Then, the feature point candidate position clustering unit 140 may output position information of the center point of the largest cluster as final feature point position information.

Figure 3:
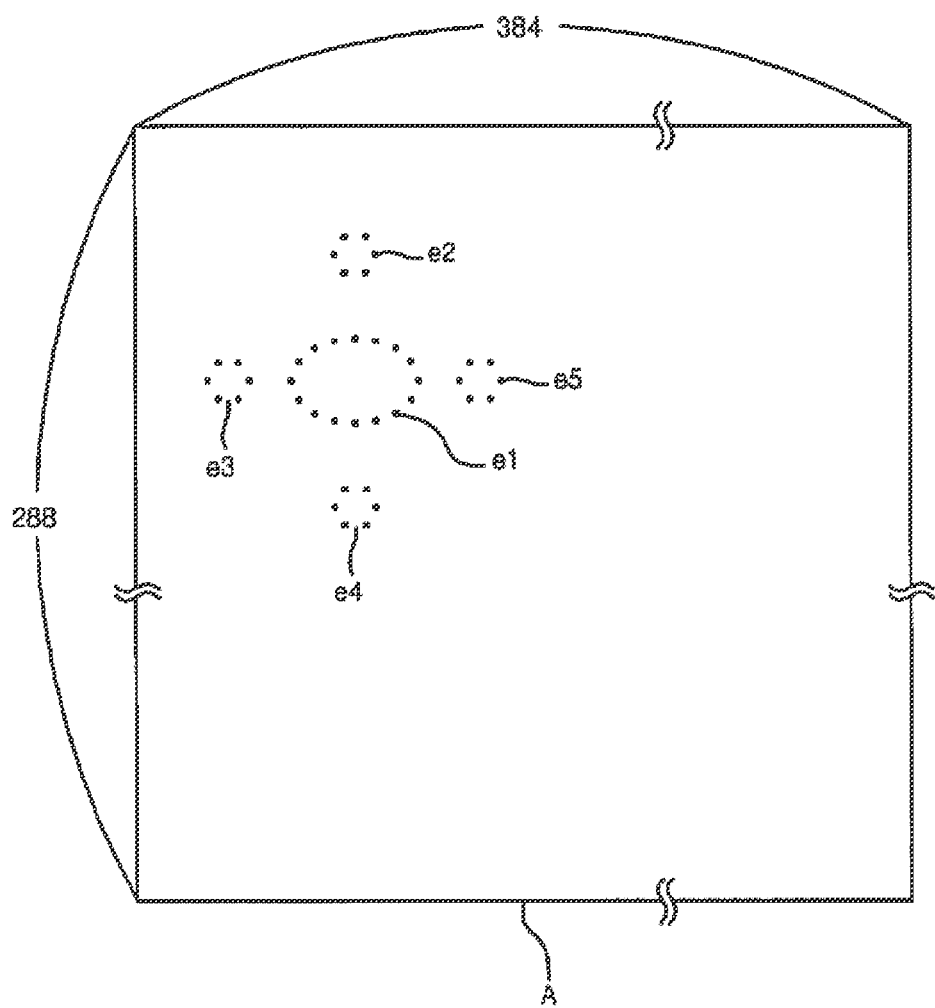
FIG. 3 is a diagram for illustrating the functions of a feature point candidate position clustering unit.

FIG. 3 is a diagram for illustrating functions of the feature point candidate position clustering unit 140. The black points show feature points according to the first feature point position information and the second feature point position information obtained by the feature point candidate position detection unit 130, and when these feature points form five clusters of e1 to e5, position information of the center point of the largest cluster e1 may be the final feature point position information. As a matter of fact, the present disclosure is not limited thereto, and a variety of modified examples may be assumed. For example, it is not limited to the center point, and a certain representative position that can represent a corresponding cluster may be implemented as information thereon.

The feature point position adjustment unit 150 may receive the final feature point position information and then adjust the information into position information corresponding to the size of the facial image input into the normalization unit 110 to output the feature point position information. That is, since the size of the facial image is changed by the normalization unit 110, the feature point position adjustment unit 150 may perform a function of adjusting the final feature point position information obtained by the feature point candidate position clustering unit 140 into the position information corresponding to the size of the facial image input into the normalization unit 110.

In FIG. 1, when the facial image input into the apparatus 100 for detecting a position of a face feature point is a multi-scale image of a predetermined size for the feature point position detector 130, the normalization unit 110, the image conversion unit 120, and the feature point position adjustment unit 150 may not be required.

Figure 4:
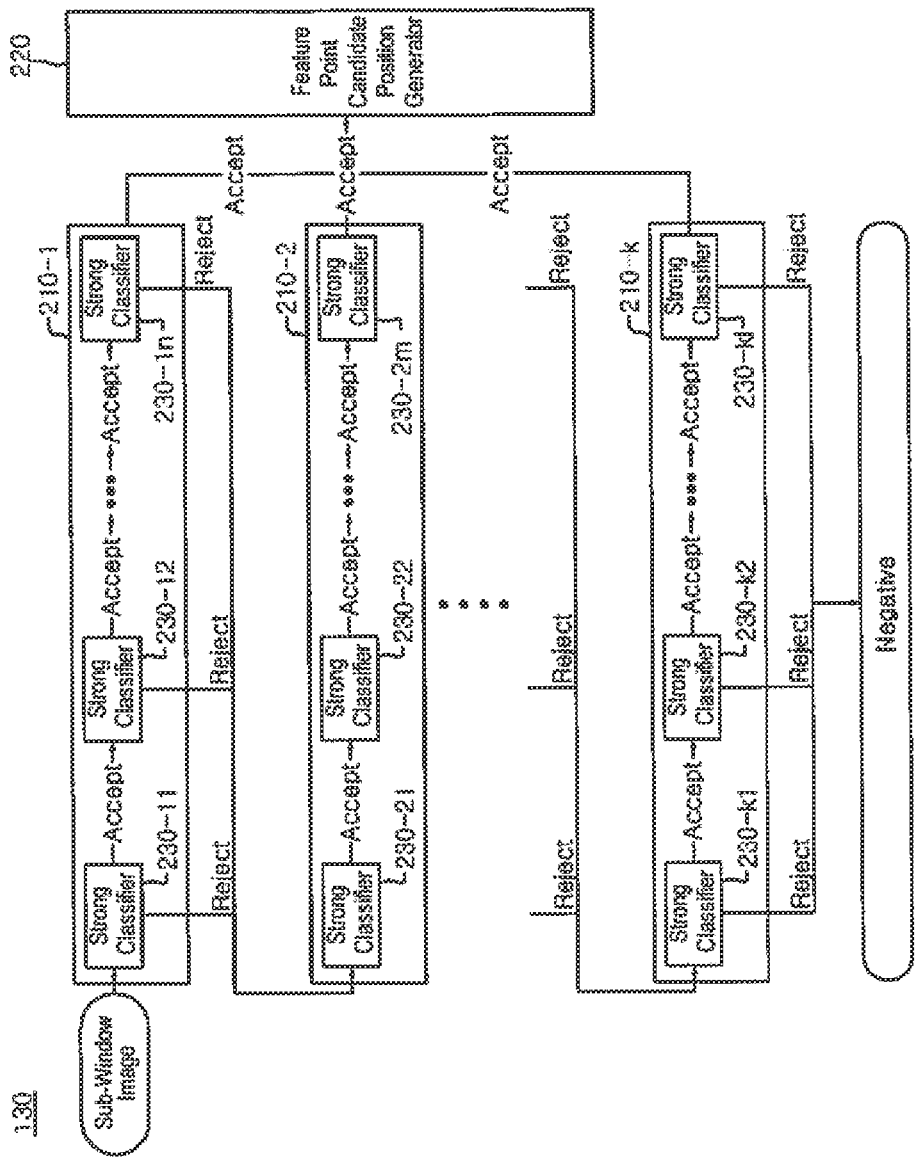
FIG. 4 illustrates a feature point candidate position detector that employs an Adaboost learning algorithm in accordance with an embodiment of the present disclosure.

FIG. 4 illustrates the feature point candidate position detection unit 130 according to an embodiment of the present disclosure.

Referring to FIG. 4, the feature point candidate position detection unit 130 according to an embodiment of the present disclosure may include a classifier 210-1, re-classifiers 210-2 to 210-$k$, and a feature point candidate position generator 220. Here, the classifier 210-1 may be a classifier corresponding to a so-called first layer, and the re-classifiers 210-2 to 210-$k$ may be classifiers respectively corresponding to a so-called second to k-th layers. For reference, the first layer may include at least one strong classifier including patterns acquired by learning from an ordinary facial image, and the second to k-th layers may include at least one strong classifier including patterns acquired by learning from an unusual facial image, with the degree of abnormality increasing as k increases. The classifier 210-1, which is a classifier of the first layer, may include strong classifiers 230-11 to 230-1$n$; the re-classifier 210-2, which is a classifier of the second layer, may include strong classifiers 230-21 to 230-2$m$; and the re-classifier 210-$k$, which is a classifier of the k-th layer, may include strong classifiers 230-$k$1 to 230-$k$l. The classifier 210-1 and the re-classifiers 210-2 to 210-$k$ may include one or more strong classifiers respectively having configurations different from one another.

Functions of each block shown in FIG. 4 are as follows.

The classifier 210-1 may classify an input sub-window image as one of the first feature point candidate recommendation image and the first feature point candidate non-recommendation image by using first feature patterns, the first feature patterns having been selected among the patterns of an ordinary facial image by learning using the Adaboost learning algorithm, and may generate position information for the first feature point candidate recommendation image.

Each of the re-classifiers 210-2 to 210-$k$ may reclassify the sub-window image classified as a feature point candidate non-recommendation image by the classifier 210-1, which is a classifier of the first layer, and the re-classifiers 210-2 to 210-$k$, which are classifiers of the second layer, as one of the second feature point candidate recommendation image and the second feature point candidate non-recommendation image by using the second feature patterns, the second feature patterns having been selected among the patterns of an unusual facial image by learning using the Adaboost learning algorithm, and may generate feature point position information for the second feature point candidate recommendation image.

According to the above, the classifier 210-1 may generate first feature point candidate positions of the first feature point candidate recommendation image for an ordinary facial image, and each of the re-classifiers 210-2 to 210-k may generate second feature point candidate positions of the second feature point candidate recommendation image for an unusual facial image.

The strong classifiers 230-11 to 230-1n included in the first layer are configured to classify into the first feature point candidate recommendation image and the first feature point candidate non-recommendation image by using the first feature pattern, the first feature pattern having been selected by learning using the Adaboost learning algorithm, and output first feature point candidate position information. Here, in order to output the first feature point candidate position information, all the strong classifiers 230-11 to 230-1n included in the first layer should be determined as the first feature point candidate recommendation image.

In addition, the strong classifiers 230-21 to 230-2m included in the second layer are configured to classify into the second feature point candidate recommendation image and the second feature point candidate non-recommendation image by using the second feature pattern, the second feature pattern having been selected by learning using the Adaboost learning algorithm, and output second feature point candidate position information. Here, in order to output the second feature point candidate position information through the second layer, all the strong classifiers 230-21 to 230-2m included in the second layer should be determined as the second feature point candidate recommendation image.

In addition, the strong classifiers 230-k1 to 230-kl included in the k-th layer classify into the second feature point candidate recommendation image and the second feature point candidate non-recommendation image by using the second feature pattern (which may be different from the second feature pattern used by the strong classifiers 230-21 to 230-2m), the second feature pattern having been selected by learning using the Adaboost learning algorithm, and output second feature point candidate position information. Here, in order to output the second feature point candidate position information through the k-th layer, the input sub-window image should be determined as the second feature point candidate recommendation image by all the strong classifiers 230-k1 to 230-kl included in the k-th layer.

In each of the cascaded strong classifiers 230-11 to 230-1n, 230-21 to 230-2m, . . . , and 230-k1 to 230-kl, a strong classifier in a former stage may classify the sub-window images into the first and second feature point candidate recommendation images and the first and second feature point candidate non-recommendation images by using a smaller number of first and second feature patterns, the first and second feature patterns having been selected by learning using the Adaboost learning algorithm, as compared with a strong classifier in a latter stage. For example, the strong classifier 230-11 may use two first feature patterns, the strong classifier 230-12 may use ten first feature patterns, and the strong classifier 230-1n may use thirty first feature patterns. The reason is to lightly filter the sub-window images using a small number of patterns at the strong classifiers in the front stage of each layer, in view of the fact that most of the sub-window images are determined as "negative" (i.e., successively determined as the feature point candidate non-recommendation image up to the k-th layer), since the number of points in a single image determined as positions of face feature points is small. Accordingly from the example, although one hundred sub-window images that are sequentially input are classified as the first and second feature point candidate recommendation images at the strong classifier in the former stage, only fifty sub-window images may be classified as the first and second feature point candidate recommendation images (i.e., accepted) at the strong classifier of the next stage, and the first and second feature point candidate recommendation images that pass (i.e., are accepted) the n-th strong classifier of the final stage may be reduced to ten. Accordingly, the feature point position information of the first and second feature point candidate recommendation images generated at the strong classifiers 230-1n, 230-2m and 230-kl of the final stages of the classifier 210-1 and the re-classifiers 210-2 to 210-k may be position information with a high probability of including a feature point.

The feature point candidate position generator 220 may store and output pieces of the first and second feature point candidate position information respectively output from the classifier 210-1 and the re-classifiers 210-2 to 210-n. The feature point candidate position generator 220 may store and then output the pieces of the first and second feature point candidate position information for all the sub-window images of the image A of FIG. 2.

Figure 5:
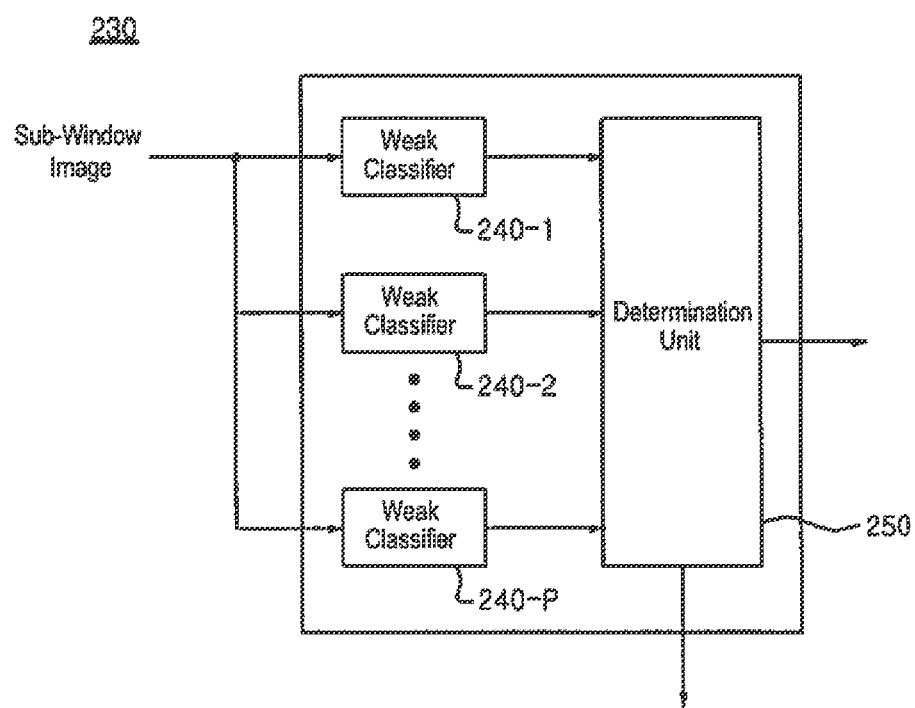
FIG. 5 illustrates an example of a strong classifier of the feature point candidate position detector shown in FIG. 4.

FIG. 5 illustrates an example strong classifier of the feature point candidate position detector 130 shown in FIG. 4.

Referring to FIG. 5, the strong classifier 230 according to an embodiment may include weak classifiers 240-1 to 240-p and a determination unit 250.

Functions of each block shown in FIG. 5 are as follows.

If a sub-window image is input, each of the weak classifiers 240-1 to 240-p may generates a feature value indicating whether the sub-window image is a feature point candidate recommendation image or a feature point candidate non-recommendation image using feature patterns different from one another.

The determination unit 250 combines the results from the weak classifiers 240-1 to 240-p, outputs feature point candidate position information and the sub-window image to the strong classifier in the latter stage (if there is no strong classifier in the latter stage, a "positive" state is recorded in the feature point candidate position generator 220) when the sub-window image is the feature point candidate recommendation image, and outputs feature point candidate non-recommendation position information and the sub-window image to the re-classifiers 210-2 to 210-k in the latter stage when the sub-window image is the feature point candidate non-recommendation image.

Figure 6:
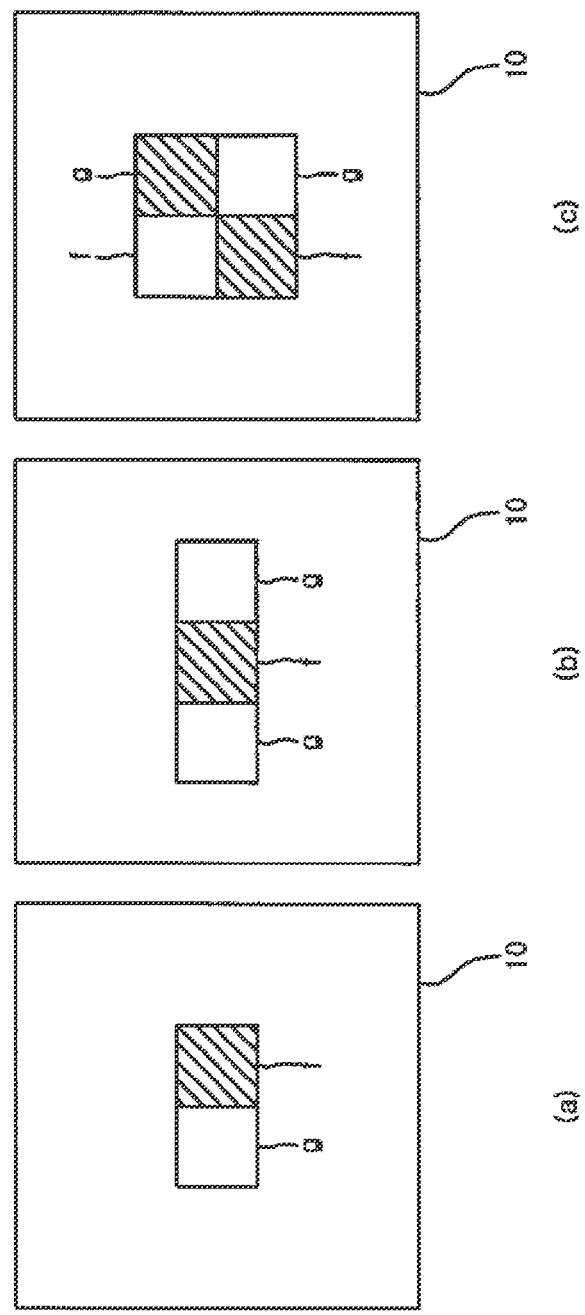
FIG. 6 illustrates feature patterns learned and selected by using an Adaboost learning algorithm in accordance with an embodiment of the present disclosure.

FIG. 6 shows feature patterns selected by learning using an Adaboost learning algorithm according to an embodiment of the present disclosure. When three weak classifiers 240-1 to 240-3 form one strong classifier, feature patterns shown in FIGS. 6 (a), (b), and (c) may be used for weak classifiers different from one another. The feature pattern shown in FIG. 6 (a) denote a pattern including two squares disposed at corresponding positions in a sub-window 10, the feature pattern FIG. 6 (b) denote a pattern including three squares disposed at corresponding positions in the sub-window 10, and the feature pattern FIG. 6 (c) denote a pattern including four squares disposed at corresponding positions in the sub-window 10. In addition, a dark image may exist in a shaded square f of the feature patterns shown in FIGS. 6 (a), (b), and (c), and a bright image may exist in a square g. That is, the feature patterns may designate one or more regions f where a dark image exists and one or more regions g where a bright image exists within the sub-window 10. In addition, each of the feature patterns shown in FIGS. 6 (a), (b), and (c) is learned using an Adaboost learning algorithm, and a weighting factor may be set to be high if the probability of finding a feature point position is high and set to be low if the probability is low, and weighting factors of the weak classifiers 240-1 to 240-3 forming one strong classifier may be set to make a sum of 1. In addition, a threshold value for classifying the input sub-window image into the feature point candidate recommendation image and the feature point candidate non-recommendation image may be set in each of the weak classifiers and the strong classifiers by learning using an Adaboost learning algorithm.

A method in which the weak classifiers 240-1 to 240-$p$ of FIG. 5 classifies a sub-window image into the feature point candidate recommendation image and the feature point candidate non-recommendation image by using FIG. 6, will be described as follows.

Each of the weak classifiers 240-1 to 240-$p$ of FIG. 5 may generate a feature value indicating whether a sub-window image is the feature point candidate recommendation image or the feature point candidate non-recommendation image by comparing a set threshold value with a difference between a total sum of pixels in the sub-window image existing within the square g and a total sum of pixels in the sub-window image existing within the square f of one selected pattern of the sub-window 10. The feature value may have a value of 1 when the sub-window image is the feature point candidate recommendation image and may have a value of 0 when the sub-window image is the feature point candidate non-recommendation image.

A method in which the determination unit 250 of FIG. 5 classifies a sub-window image into the feature point candidate recommendation image and the feature point candidate non-recommendation image by combining feature values output from the weak classifiers 240-1 to 240-$p$ by using FIG. 6 will be described as follows.

The determination unit 250 may calculate a total sum of values obtained by multiplying feature values output from the respective weak classifiers 240-1 to 240-$p$ with weighting factors set in the respective weak classifiers 240-1 to 240-$p$ and determine whether the sub-window image is the feature point candidate recommendation image or the feature point candidate non-recommendation image by comparing the total sum with a threshold value set in the strong classifier 230.

Then, the strong classifier 230 may calculate and output a confidence value for the feature point candidate position information of the feature point candidate recommendation image. In this case, the determination unit 250 may output a total sum of values obtained by multiplying feature values output from the respective weak classifiers 240-1 to 240-$p$ by weighting factors of the respective weak classifiers 240-1 to 240-$p$ as the confidence value.

In addition, using the confidence value, the feature point candidate position clustering unit 140 may determine final feature point candidate position information with reference to a total sum of values obtained by multiplying respective pieces of the feature point candidate position information of the largest cluster created through clustering by the confidence values of the respective pieces of the feature point candidate position information.

As an example of the Adaboost learning algorithm used in the present disclosure, a paper entitled "Robust Real-Time Face Detection" developed by Paul Viola and Michael J. Jones and published in International Journal of Computer Vision, Volume 57, Issue 2 dated May, 2004 may be referred to. All the descriptions used for detecting positions of feature points included in this paper (including a technique of selecting feature patterns from the patterns of a facial image by learning using the Adaboost learning algorithm and a technique of detecting positions of feature points by cascading strong classifiers and the like) are hereby incorporated by reference in the method of detecting a face feature point of the present disclosure.

Although not shown, the face recognition system according to an embodiment of the present disclosure may identify an input facial image by comparing feature point position information extracted from a registered facial image with feature point position information extracted from an input facial image and determining similarity therebetween.

The embodiments according to the present disclosure described above can be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present disclosure or a program command known to be used by those skilled in the art of the computer software field. The computer-readable recording medium includes, for example, a magnetic medium, such as a hard disk, a floppy disk and a magnetic tape, an optical recording medium, such as a CD-ROM and a DVD, a magneto-optical medium, such as an optical disk, and a hardware device specially configured to store and execute program commands, such as a ROM, a RAM, a flash memory and the like. The program command includes, for example, a high-level language code that can be executed by a computer using an interpreter or the like, as well as a machine code generated by a compiler. The hardware devices can be configured to operate using one or more software modules in order to perform the processing according to the present disclosure, and vice versa. In the foregoing discussion, although the present disclosure has been described in connection with the specific matters, such as the specific components, the exemplary embodiments, and the drawings, they are provided only for assisting in the understanding of the present disclosure, and the present disclosure is not limited to the embodiments. It will be apparent that those skilled in the art can make various modifications and changes thereto from these descriptions.

Therefore, the spirit of the present disclosure should not be limited to the above-described embodiments, and the appended claims and what are modified equally or equivalently thereto will be considered to fall within the scopes of the present disclosure.

EXPLANATION OF REFERENCE NUMERALS

100: Apparatus for Detecting Position of Face Feature Point
110: Normalization Unit
120: Image Conversion Unit
130: Feature Point Candidate Position Detection Unit
140: Feature Point Candidate Position Clustering Unit
150: Feature Point Position Adjustment Unit
210-1: Classifier
210-2 to 210-$k$: Re-Classifier
220: Feature Point Candidate Position Generator
230-11 to 230-$kl$: Strong Classifier
240-1 to 240-$p$: Weak Classifier
250: Determination Unit

The invention claimed is:

1. A method comprising:

classifying a sub-window image into a first feature point candidate recommendation image and a first feature point candidate non-recommendation image by using first selected feature patterns, wherein a classifier includes cascaded strong classifiers, and a strong classifier in a former stage among the cascaded strong classifiers classifies the sub-window image into the first feature point candidate recommendation image and the first feature point candidate non-recommendation image using a smaller number of the first feature patterns, as compared with a strong classifier in a latter stage;

generating first feature point candidate position information of the first feature point candidate recommendation image;

re-classifying the sub-window image classified as the first feature point candidate non-recommendation image into a second feature point candidate recommendation image and a second feature point candidate non-recommendation image by using second selected feature patterns;

generating second feature point candidate position information of the second feature point candidate recommendation image;

storing the first feature point candidate position information and pieces of the second feature point candidate position information for sub-window images of a facial image;

forming clusters by performing clustering in view of the first feature point candidate position information and the second feature point candidate position information; and generating position information of a certain representative position of the first feature point candidate position information and the second feature point candidate position information forming a largest cluster among the clusters as feature point position information.

2. The method of claim 1, wherein the first feature patterns are determined based on features of an ordinary facial image, and the second feature patterns are determined based on features of an unusual facial image.

3. The method of claim 2, wherein the ordinary facial image and the unusual facial image are determined by comparing the ordinary facial image and the unusual facial image with a normal image and determining whether or not it exceeds a preset threshold value.

4. The method of claim 1, wherein a strong classifier classifies the sub-window image into the first feature point candidate recommendation image and the first feature point candidate non-recommendation image using a smaller number of the first feature patterns, as compared with a strong classifier in a latter stage.

5. The method of claim 4, wherein a second strong classifier classifies the sub-window image into the second feature point candidate recommendation image and the second feature point candidate non-recommendation image using a smaller number of the second feature patterns, as compared with a strong classifier in a latter stage.

6. The method of claim 1, further comprising:

normalizing an original facial image into a grey image of the same size prior to classifying a sub-window image into a first feature point candidate recommendation image; and converting the normalized facial image into a multi-scale facial image, wherein the sub-window image is the multi-scale facial image.

7. An apparatus comprising:

a classifier to classify a sub-window image into a first feature point candidate recommendation image and a first feature point candidate non-recommendation image using first selected feature patterns, and generate first feature point candidate position information of the first feature point candidate recommendation image, wherein the classifier includes cascaded strong classifiers, and a strong classifier in a former stage among the cascaded strong classifiers that classifies the sub-window image into the first feature point candidate recommendation image and the first feature point candidate non-recommendation image using a smaller number of the first feature patterns, as compared with a strong classifier in a latter stage;

at least one re-classifier to re-classify the sub-window image classified as the first feature point candidate non-recommendation image into a second feature point candidate recommendation image and a second feature point candidate non-recommendation image using second selected feature patterns, and generate second feature point candidate position information of the second feature point candidate recommendation image; and a feature point candidate position generation unit for storing the first feature point candidate position information and the second feature point candidate position information of sub-window images of a facial image; and a feature point candidate position clustering unit for forming clusters by performing clustering in view of the first feature point candidate position information and the second feature point candidate position information, and generating position information of a certain representative position of the first feature point candidate position information and the second feature point candidate position information forming the largest cluster among the clusters as feature point position information.

8. The apparatus of claim 7, wherein each of the first feature patterns and the second feature patterns designate one or more bright regions and one or more dark regions within the sub-window image.

9. The apparatus of claim 8, wherein the one or more bright regions and the one or more dark regions are classified based on at least one preset brightness value.

10. The apparatus of claim 7, wherein each of the strong classifiers includes at least one weak classifier and a determination unit, wherein each weak classifier calculates a difference between a first value obtained by adding pixel values within the sub-window image designated by the dark region of the previously designated first feature patterns and a second value obtained by adding pixel values within the sub-window image designated by the bright region, and generates first feature values for determining whether the sub-window image is the first feature point candidate recommendation image or the first feature point candidate non-recommendation image by comparing the difference value with a set first threshold value, and the determination unit determines whether the sub-window image is the first feature point candidate recommendation image or the first feature point candidate non-recommendation image by comparing a second threshold value with a first confidence value which is a total sum of values obtained by multiplying the respective first feature values by weighting factors set to the respective first feature values.

11. The apparatus of claim 7, wherein the re-classifier includes cascaded strong classifiers, and a strong classifier in a former stage among the cascaded strong classifiers reclassifies the sub-window image into the second feature point candidate recommendation image and the second feature point candidate non-recommendation image using a smaller number of the second feature patterns, as compared with a strong classifier in a latter stage.

12. The apparatus of claim 11, wherein each of the strong classifier includes at least one weak classifier and a determination unit, wherein each weak classifier calculates a difference value between a third value obtained by adding pixel values within the sub-window image designated by the dark region of the previously designated second feature patterns and a fourth value obtained by adding pixel values within the sub-window image designated by the bright region, and generates second feature values for determining whether the sub-window image is the second feature point candidate recommendation image or the second feature point candidate non-recommendation image by comparing the difference value with a set third threshold value, and the determination unit determines whether the sub-window image is the second feature point candidate recommendation image or the second feature point candidate non-recommendation image by comparing a fourth threshold value with a second confidence value which is a total sum of values obtained by multiplying the respective second feature values by weighting factors set to the respective second feature values.

13. The apparatus of claim 7, further comprising:
a normalization unit to normalize an original facial image into a grey image of the same size; and
an image conversion unit to convert the normalized facial image into a multi-scale facial image, wherein the sub-window image is the multi-scale facial image.

14. A non-transitory computer-readable medium having instruction which when executed by a processor causes the processor to:
classify a sub-window image into a first feature point candidate recommendation image and a first feature point candidate non-recommendation image by using first selected feature patterns, wherein a classifier includes cascaded strong classifiers, and a strong classifier in a former stage among the cascaded strong classifiers classifies the sub-window image into the first feature point candidate recommendation image and the first feature point candidate non-recommendation image using a smaller number of the first feature patterns, as compared with a strong classifier in a latter stage;
generate first feature point candidate position information of the first feature point candidate recommendation image;
re-classify the sub-window image classified as the first feature point candidate non-recommendation image into a second feature point candidate recommendation image and a second feature point candidate non-recommendation image by using second selected feature patterns;
generate second feature point candidate position information of the second feature point candidate recommendation image;
store the first feature point candidate position information and pieces of the second feature point candidate position information for sub-window images of a facial image;
form clusters by performing clustering in view of the first feature point candidate position information and the second feature point candidate position information; and
generate position information of a certain representative position of the first feature point candidate position information and the second feature point candidate position information forming a largest cluster among the clusters as feature point position information.

15. The computer-readable medium of claim 14, wherein the first feature patterns are determined based on features of an ordinary facial image, and the second feature patterns are determined based on features of an unusual facial image.

16. The computer-readable medium of claim 14, wherein the ordinary facial image and the unusual facial image are determined by comparing the ordinary facial image and the unusual facial image with a normal image and determining whether or not it exceeds a preset threshold value.

* * * * *